Patented June 25, 1940

2,205,789

UNITED STATES PATENT OFFICE 2,205,789

REACTION PRODUCTS OF ORGANIC BASES AND HYDROFLUOSILICIC ACID

Ludwig J. Christmann, Jersey City, and David W. Jayne, Jr., Elizabeth, N. J., assignors to American Cyanamid Company, New York, N. Y., a corporation of Maine No Drawing. Application September 10, 1936, Serial No. 100,108

8 Claims. (Cl. 167—22)

This invention relates to insecticidal compositions and it has particular relation to compositions adapted for use as mothproofing agents. The main objects of the invention are to provide a composition which acts simultaneously as an exterminator and repellant for moths or moth larvae. An additional object of the invention is to provide a new composition of matter consisting of a guanidine reaction product of hydrofluosilicic acid.

It has heretofore been observed that there are two distinct types of mothproofing agents in common use at the present time. One type is designed to operate as an exterminating agency, killing the moths or moth larvae by reason of its toxic properties. The other type is designed to act merely as a repellant which prevents the moth larvae from attacking the fabrics to which it is applied, but does not directly cause the death of the larvae through its toxic action.

This invention involves a discovery that the reaction products of hydrofluosilicic acid and organic bases are effective both as repellants and exterminators for moths, moth larvae and other insects.

The invention involves the particular discovery that the reaction products of hydrofluosilicic acid and a guanidine either substituted or unsubstituted are particularly effective as insecticides by the term "guanidine either substituted or unsubstituted" is meant any compound having the general formula

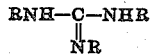

where R is either hydrogen or a substituted element or groups of elements so long as the compound thus formed may still be said to be a guanidine or a substituted guanidine. It is to be understood that the guanidine-hydrofluosilicic acid reaction products hereinafter mentioned are but examples only and reference thereto is not to be taken in any limiting sense as our experiments have been of such a nature as to determine that all guanidines are effective for the purpose in hand. Moreover, the hydrofluosilicic acid-guanidine reaction products are new chemical compounds discovered and prepared by us for the first time.

As illustrations of reaction products which we believe are new and which have insecticidal properties, there may be mentioned the reaction products of hydrofluosilicic acid and guanidine itself, the substituted guanidines, the alkyl, aryl and alkyl-aryl guanidines in the mono-, di-, and tri-substituted forms, as well as both the symmetrical and asymmetrical modifications. As to the aryl substituted guanidine-hydrofluosilicates, the aromatic ring may contain a further substitution such as the halogens, sulfur acid groups and the nitro groups. All of these materials are not only new chemical compounds but have definite insecticidal properties. Their use for this purpose may be either as the pure substances, usually dissolved in a suitable solvent or as mixtures thereof.

As an example of an alkyl substituted guanidine derivative of hydrofluosilicic acid found to have insecticidal properties, we may mention the monomethyl guanidine derivative of hydrofluosilicic acid. This derivative may be prepared by stirring 70 grams of barium hydroxide $(Ba(OH)_2 \cdot 8H_2O)$ in 200 cc. of warm distilled water and then adding a solution of 50 g. of methyl guanidine sulphate (Eastman) in 100 cc. of water. This mixture may then be allowed to stand several hours and the precipitated barium sulphate removed by filtration. The filtrate (solution of methyl guanidine hydrate) may then be saturated with $CO_2$ and refiltered to remove the small amount of barium carbonate present. The filtrate (solution of methyl guanidine carbonate) may then be boiled down in an open vessel to a volume of about 100 cc., $CO_2$ being slowly bubbled through the solution during evaporation. The concentrated methyl guanidine carbonate solution should then be cooled to room temperature and 85 g. of 28% of hydrofluosilicic acid added carefully with stirring. The resulting solution of the fluosilicate of the guanidine may then be evaporated to a thin syrup, cooled and diluted with about 10 parts of anhydrous ethyl alcohol. This throws monomethyl guanidine fluosilicate out of solution as a white crystalline precipitate which should then be filtered off, washed with alcohol and air dried. The product thus prepared is 99% pure.

The asymmetrical dimethyl guanidine fluosilicate may be prepared as above, using 50 g. of asymmetrical dimethyl guanidine sulphate (Eastman), 65 g. of barium hydroxide and 75 g. of 28% hydrofluosilicic acid. This product is also a white crystalline powder.

The diphenyl guanidine and the di-(mixed)-xylyl guanidine derivatives of hydrofluosilicic acid are other examples of compounds of this class which are found by actual experience to be excellent mothproofing agents of this dual function type. The diphenyl guanidine derivative is prepared by mixing 20 cc. of 30% hydrofluosilicic acid with 17 g. of diphenyl guanidine. A paste is thus formed which is stirred until a granular suspension is produced. This suspension is warmed a few minutes upon a steam bath and is then subjected to filtration to remove the granular material. The material, after filtering, is dried at 40° C. and the product, the diphenyl guanidine reaction product of hydrofluosilicic acid, is obtained as a dry, white powder soluble in water, ethyl alcohol and Carbitol (ethyl ether of diethylene glycol). It has a relatively sharp melting point (223–225° C.), which is a strong indication that the material is a true chemical compound and not a mere physical mixture.

The di-(mixed)-xylyl guanidine derivative of hydrofluosilicic acid is prepared by stirring 50 g. of di-(mixed)-xylyl guanidine into 60 cc. of hydrofluosilicic acid of 30% concentration. At first a gummy mass is produced, but this may be transformed into a brittle product by warming it upon a steam bath. It is then subjected to filtration and dried under vacuum at 85° C. for three hours. The product (di(mixed)-xylyl guanidine hydrofluosilicate) is obtained as a dry cream-colored powder soluble in water, Carbitol, cellosolve (ethyl ether of ethylene blycol), ethyl and amyl alcohol.

As an example of an aryl substituted guanidine derivative, the phenyl guanidines may be mentioned as either the mono, di, or tri substituted and either symmetrical or asymmetrical. Other aryl groups may be used as substituents, such for instance as benzyl, xylyl and naphthyl, although the lower members of the series are more desirable from the standpoint of cost and ease of manufacture. The aromatic ring grouping of such derivatives may have further substitutions made therein as above set forth.

These materials may be applied to woolen fabrics which are to be mothproofed in any convenient method. Preferably they are dissolved in a suitable organic solvent, such as those above indicated as being solvents for the compounds, and are then applied as a spray. Of course, processes of dipping may also be employed. It is also possible to make water solutions of the materials and to apply these solutions by processes of dipping. The latter method is particularly applicable at the factory where the fabrics are produced.

The new insecticidal agents are applied in relatively low concentration and generally a solution containing ¼% to 3% of the agent is sufficient. They are, as above indicated, effective both as toxic agents for the direct extermination of the moths or moth larvae and also as repellant agents to prevent the moth larvae from attacking the fabric. They are non-irritating to man and do not possess any disagreeable odors. Also they do not attack, stiffen or stain the fabrics to which they are applied.

The invention is not limited to the use of the guanidine salts of hydrofluosilicic acid, but instead it is applicable to the hydrofluosilicates of almost any of the organic bases. The following constitute specific examples of organic bases which have been reacted with hydrofluosilicic acid:

Aniline
Methylaniline
Orthotoluidine
Methyltoluidine
Paratoluidine
Alphanaphthylamine
Betanaphthylamine
Metanitraniline
Diphenylamine
Metaphenylenediamine
Paraphenylenediamine
Ethylaniline
Nitrosodiphenylamine
Paraaminoazobenzene
Methylamine
Ethylenediamine
Ethylamine
Paraaminobenzoic acid All of these compounds may be prepared by dissolving the desired organic base in several volumes of 95% ethyl alcohol, which is then treated with a 30% aqueous solution of hydrofluosilicic acid. During the reaction an excess of the base should be maintained. The product may be purified by washing it with 95% ethyl alcohol to free it from excess base. It is then dried in air. Final drying may be effected in a desiccator over sulphuric acid.

All of these bases upon interaction with hydrofluosilicic acid result in definite chemical compounds of crystalline structure. It is found that the alphanaphthylamine derivative and the metaphenylenediamine compound are more or less unstable in water and for that reason they should be applied in solution in an inert organic solvent. It is also noted that the metanitraniline and diphenylamine compounds upon exposure to air respectively change to a yellow color and a blue color and for that reason they cannot be applied to fabrics except those of a tint corresponding to the colors to which the compounds change.

Although we have shown and described only the preferred embodiments of the invention it will be apparent that numerous modifications may be made therein without departure from the spirit of the invention or the scope of the appended claims.

The present application is a continuation in part of our co-pending application Serial No. 652,022.

We claim:

1. An insecticidal composition including a reaction product of hydrofluosilicic acid and a guanidine.

2. An insecticidal composition including a reaction product of hydrofluosilicic acid and a substituted guanidine.

3. An insecticidal composition including a reaction product of hydrofluosilicic acid and an alkyl guanidine.

4. An insecticidal composition including a reaction product of hydrofluosilicic acid and an aryl guanidine.

5. An insecticidal composition including a reaction product of hydrofluosilicic acid and a phenyl guanidine.

6. An insecticidal composition including a reaction product of hydrofluosilicic acid and a diphenyl guanidine.

7. An insecticidal composition including a reaction product of hydrofluosilicic acid and a xylyl guanidine.

8. An insecticidal composition including a reaction product of hydrofluosilicic acid and a dixylyl guanidine.

LUDWIG J. CHRISTMANN.
DAVID W. JAYNE, Jr.